A. I. AMBLER.
Car Brake.
No. 40,007. Patented Sept. 22, 1863.
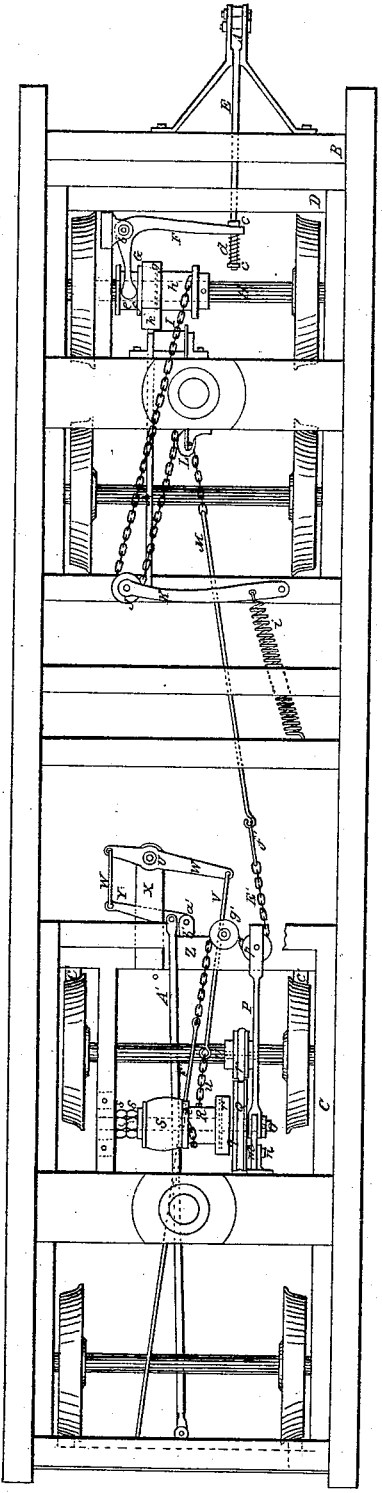
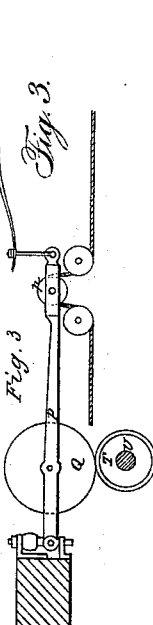
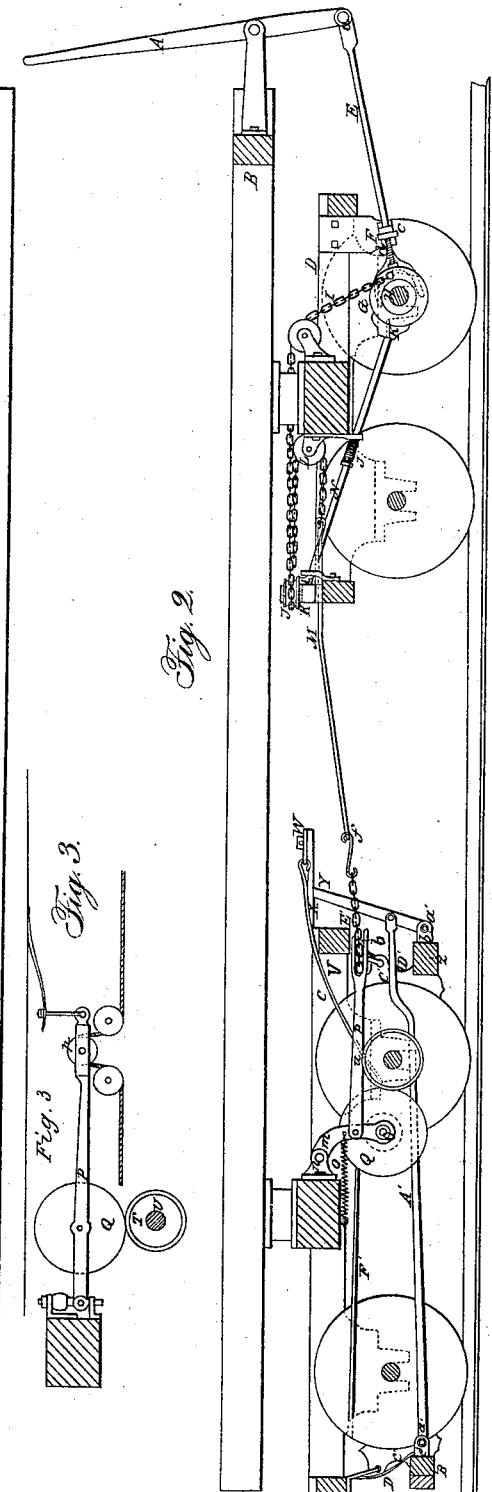
Witnesses:
Geo W Reed
Inventor:
A I Ambler

UNITED STATES PATENT OFFICE.

AUGUSTINE IREL AMBLER, OF CHICAGO, ILLINOIS.

IMPROVEMENT IN RAILROAD-CAR BRAKES.

Specification forming part of Letters Patent No. 40,007, dated September 22, 1863.

*To all whom it may concern:*

Be it known that I, AUGUSTINE IREL AMBLER, of Chicago, in the county of Cook and State of Illinois, have invented a new and useful Improvement in Railroad-Car Brakes; and I do hereby declare that the following is a full, clear, and exact description of the same, reference being had to the accompanying drawings, making a part of this specification, in which—

Figure 1 represents a plan or top view of the trucks of a passenger-car and tender; Fig. 2, a side view of the same; Fig. 3, a detached view of a modification of a part pertaining to the same.

Similar letters of reference indicate corresponding parts in the several figures.

This invention consists in a novel means employed for operating the brakes of a series or train of cars, the several parts being so arranged that by actuating a single lever on the engine or locomotive all the brakes may be applied simultaneously, or nearly so, thereby avoiding the necessity of a plurality of brakemen, and placing the whole power of the brakes and the manipulation thereof under the control of the engineer.

To enable those skilled in the art to fully understand and construct my invention, I will proceed to describe it.

A represents a lever, which, in this instance, is attached to the front end of the frame B, containing a truck, C, of a passenger-car and a truck, D, of a tender. This is for convenience only, in practice the lever A being attached to the engine or locomotive. This lever is designed to be directly before the engineer, just back of the boiler of the locomotive.

The lower end of the lever A has a rod, E, attached to it by a pin, a, said rod being connected at its inner end to a bent lever, F, attached to the front part of the truck D of the tender by a fulcrum-pin, b. The inner end of the rod E passes through the lever F, and has a screw-thread cut upon it to receive two nuts, c c, between which the end of the lever F is fitted, and a spiral spring, d, is placed on the rod E, between the outermost nut c and the lever F.

The short arm of the lever F is forked and fitted in a groove, e, in the male part f of a c'u'ch, G, said part f being allowed to slide on the front axle, H, of the truck D, but made to turn therewith by the usual means of a feather and groove.

The female part g of the clutch is fitted loosely on the axle H, and is constructed at one end to receive the male part f of the clutch, the latter being slightly conical, as well as the recess in the female part g. This female part g of the clutch is formed with a drum, h, to which a chain, I, is attached, and this chain passes around a pulley, J, at the outer part of a lever, K, which is attached to the back part of the truck D, said lever K having a spiral spring, i, connected with it. The chain I also passes around a fixed pulley, L, attached to the center bar of the truck D. To the end of the chain I a rod, M, is attached.

N is a sliding bar which is fitted on the truck D, and has a spiral spring, j, upon it. This bar, N, has a shoe, k, on its inner end, which is of concave form, corresponding to the cylindrical form of the female part g of the clutch G. The outer end of the sliding bar N is bent upward, as shown at l in Fig. 2.

O is a shaft which is fitted in the truck C of the passenger-car. One end of this shaft is fitted in a fixed bearing, while the opposite end has its bearing in a pendent arm, m, which works on a pin, n. This arm m has a spring, o, attached to it, and to the arm m, below the spring, there is connected a rod, P, having a pulley, p, at its outer end.

On the shaft O there is permanently attached a pulley, Q, having a conical head, q, which constitutes the male part of a clutch; and R is a drum which is fitted loosely on the shaft O, and has a socket, r, at one end to receive the head q or male part of the clutch.

On the shaft O there are also placed two nuts, s, and two washers, t t, a spring, S, of india-rubber or other suitable material, being interposed between the washers. This spring, by screwing up the nuts s, is made to bear with a greater or less pressure against the end of the drum R, so that a requisite friction may be obtained between the head q and the socket r of the clutch.

The periphery of the pulley Q is grooved, and is in line with a pulley, T, on the front axle, U, of the truck C.

The spiral spring o has a tendency to keep the pulley Q free from the pulley T on the axle U.

The drum R has a chain, u, attached to it, the outer end of the latter being connected to a rod, V, which is attached to the long arm of a lever, W. This lever W has its fulcrum-pin v on a bar, X, which is attached to the front end of the truck C.

The short arm of the lever W is connected by a rod, w, to the upper end of a lever, Y, the lower end of which is connected by a fulcrum-pin, a′, with a short bar, b′, which is secured centrally to the front shoe-bar, Z, of the truck C; and to lever Y, just above the fulcrum-pin a′, there is attached by a pivot, c′, a bar, A′, which extends along underneath the axles of the truck, and is connected by a pivot, d′, to a bar, e′, attached centrally to the back shoe-bar, B′. These shoe-bars are provided at each end with a shoe, C′, and the shoe-bars are suspended from the truck C by means of springs D′, arranged in the usual way.

E′ is a chain, which is connected by a link, f′, to the rod M. This chain E passes around the pulley p at the outer end of the rod P, and then passes around a fixed pulley, g′, attached to the front end of the truck C, and has a rod, F′, attached to it. This rod F′ is connected to the chain E′ of the rear car. A connection is thus formed between all the rods P in the train.

The operation is as follows: When the engineer wishes to put on the brakes, he operates the lever A, which, through the medium of the bent lever F and rod E, throws the male part f of the clutch G into the female part g of the same, and causes the latter to rotate, so that the chain I will be wound upon it and the lever K drawn forward, the chain I during this movement acting upon or drawing up the chain E′, which causes the rod P to bring the pulley Q in contact with the pulley T on the axle U of the truck C, and said pulley Q will consequently be rotated, and through the medium of the clutch (previously described) rotate the drum R, so that the chain u will be wound upon it and the lever W Y actuated, and the shoes C′ applied to or made to press against the wheels. The chains by which motion is communicated to the levers are never subjected to any undue tension, for two reasons: The spring S on the shaft O may be so regulated by the nuts s as to admit of the clutch which connects the pulley Q with the drum R slipping when the tension reaches a certain point, and, further, when the lever K is drawn forward, its outer end strikes the bar N and forces it forward, so that the shoe k will press against the exterior of the female part g of the clutch and cause the latter to slip, so that the male part f will turn in the latter. To throw off the brakes, all the engineer has to do is to release and push forward the lever A, and the several springs, previously described in connection with the back-action, will instantly throw off the brakes, and the several parts will return to their original position. By this arrangement each car is provided with the means to take up the slack of its own chains, while all the cars of the train are under the complete control of the engineer, and any degree of pressure, from the minimum to the maximum, may be given to the brakes by regulating the springs S on the shafts O. This arrangement also admits of the ordinary hand attachment being applied, so that the brakes may be operated or applied when the engine or locomotive is detached from it.

I would remark that a smaller rope or cord may be attached to the upper end of the lever A, and pass through all of the cars of a train, like the bell-rope in common use. This would enable the conductor at any time to actuate the lever A and apply the brakes from any car.

I would further remark, that instead of the chains herein described wire ropes may be used, and the chains E′ and rods M F′, by which the rods P are actuated, may be arranged in endless form, so as to extend from the front to the rear car, and then forward to the front car. This would insure the brakes of the rear car being actuated a trifle in advance of the forward ones. The single chain and rods, however, seem to operate well in practice, and probably will be most generally used.

The arrangement of the chain E′ and rod P may be modified, as shown in Fig. 3, so that said rod, in applying the pulley Q to the pulley T on the axle, will be drawn downward, instead of forward. The principle, however, is precisely the same in both cases.

Having thus described my invention, what I claim as new, and desire to secure by Letters Patent, is—

1. The frictional clutch G, placed on the axle of the tender or engine, and actuated through the medium of the levers A F and rod E in connection with the chain I, lever K, and bar N, the latter being provided with the shoe k, and all arranged as shown, to operate as and for the purpose set forth.

2. The shaft O, with pulley Q, in connection with the pulley T on the axle U, and the pendent arm m, with rod P attached, and connected with the chain E′ through the medium of the pulleys p g, arranged as shown, or in any equivalent way, to operate as and for the purpose set forth.

3. The connecting of the drum R on the shaft O with the pulley Q on said shaft by means of a spring, S, arranged with nuts s, substantially as shown, for the purpose of limiting the tension of the chain u and the power of the brakes, as set forth.

4. The combination and arrangement of the clutch G, chain I, lever K, chain E′, shaft O, with pulley Q attached, the pulley T on the axle U, drum R on shaft O, connected therewith by a clutch and spring, and the chain u, attached to drum R and applied to the brakes, all in the manner substantially as and for the purpose specified.

AUGUSTINE IREL AMBLER.

Witnesses:
PETER H. WITT,
JOHN P. REIS.